United States Patent [19]
Nilsson

[11] 3,744,332
[45] July 10, 1973

[54] SCREW AND NUT MECHANISM
[75] Inventor: Sven Walter Nilsson, Partille, Sweden
[73] Assignee: SKF Industrial Trading and Development Company N. V., Amsterdam, Netherlands
[22] Filed: Oct. 14, 1971
[21] Appl. No.: 189,201

[52] U.S. Cl. .................................. 74/424.8 C
[51] Int. Cl. ................................. F16h 1/18
[58] Field of Search ........................ 74/424.8 C

[56] References Cited
UNITED STATES PATENTS
3,595,094   7/1971   Lemor ................. 74/424.8 C X
2,831,363   4/1958   Lohr .................... 74/424.8 C
3,173,304   3/1965   Strandgren ......... 74/424.8 C X
3,214,991   11/1965  Perrin ................. 74/424.8 C Primary Examiner—Leonard H. Gerin
Attorney—Dexter N. Shaw, Eugene E. Renz et al.

[57] ABSTRACT

In a screw and nut mechanism including transmission rollers the necessary displacement of the rollers one step backwards for each revolution of the nut with respect to the screw is brought about by at least one cam member, which operates between twin walls at the adjacent edge of cage, where the cam has a protected position and furthermore contacts the rollers about at their longitudinal axes.

1 Claim, 4 Drawing Figures

Patented July 10, 1973 3,744,332

SCREW AND NUT MECHANISM

BACKGROUND OF THE INVENTION

In order to reduce the friction between a nut and a screw it has been proposed to arrange a number of rollers mounted in an annular cage between the nut and the screw. The diameter of the nut is bigger an that of the screw, and the rollers are provided with a number of peripherally closed ribs meshing with the threads at the screw and at the nut, respectively.

During one revolution of the nut in relation to the screw the roller is displaced a distance in the axial direction corresponding to the pitch of the thread at the screw, and it is therefore necessary for each revolution to lift the roller out of engagement with the screw and then to push it back a distance corresponding to the pitch of the thread. This is brought about by means of cam members mounted on the nut. The aim of the present invention is to propose a convenient embodiment of the cage and the cam member, which with reasonable manufacturing costs guarantees a safe governing of the rollers and simultaneously provides a well protected position for the cam elements.

SUMMARY OF THE INVENTION

According to the invention the cage is provided with twin walls, at least at one end portion, and a cam member at the nut is designed to operate between said twin walls in order to govern the movements of the rollers, said cam member during each revolution, in turn, contacting each roller about at the longitudinal axis thereof.

DESCRIPTION OF THE PREFERRED EMBODIMENT

Figure 1:
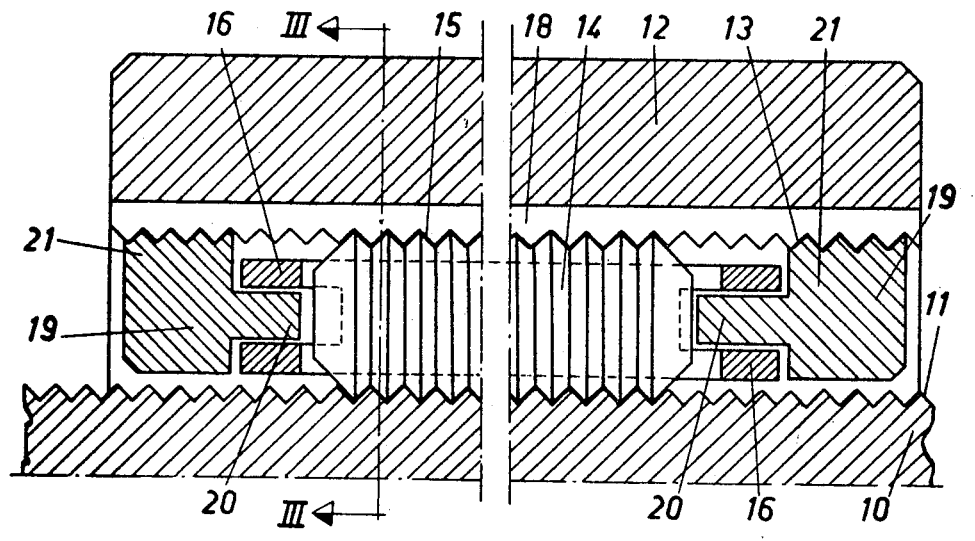
FIG. 1 is an axial section through part of a screw and the nut thereon.
Figure 3:
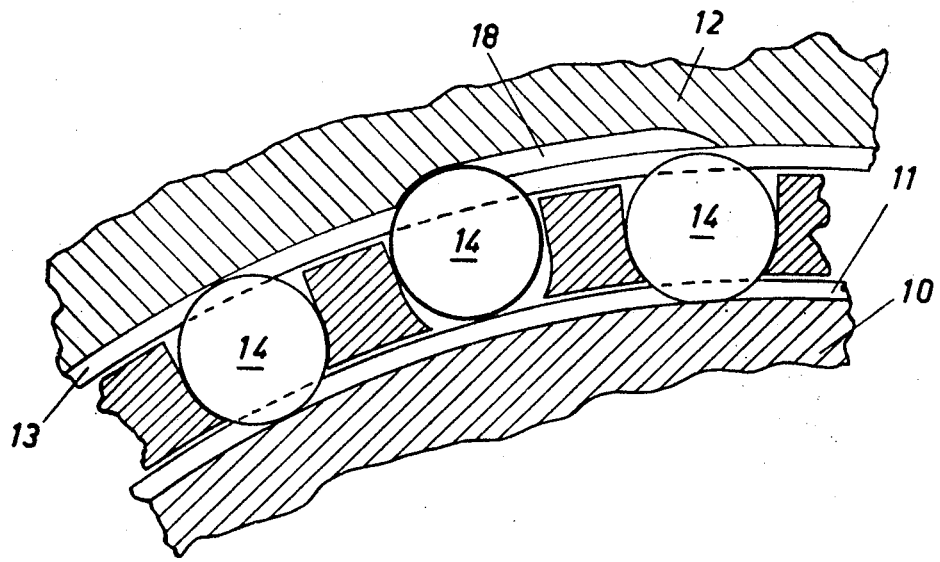
FIG. 3 is a section along line III — III in FIG. 1.

The screw 10 is provided with threads at 11. The cooperating nut 12 is also provided with a screw thread 13, the diameter of which is that much bigger than that of the thread 11 that an annular space will be formed between the screw and the nut. A number of rollers 14 operate within this space, and is each provided with a number of ribs 15, which on the present occasion have substantially the same cross sectional shape as that of the threads at the screw and at the nut.

These rollers serve as transmission elements between the nut and the screw and will reduce the friction to a considerable degree. The rollers 14 are fitted into an annual cage 16 provided with longitudinally extending slots 17, into each of which a roller 14 is mounted with sufficient clearance to make possible an axial displacement corresponding at least to the pitch of the thread at the screw and also radially a distance corresponding to the depth of the threads therein.

Figure 2:
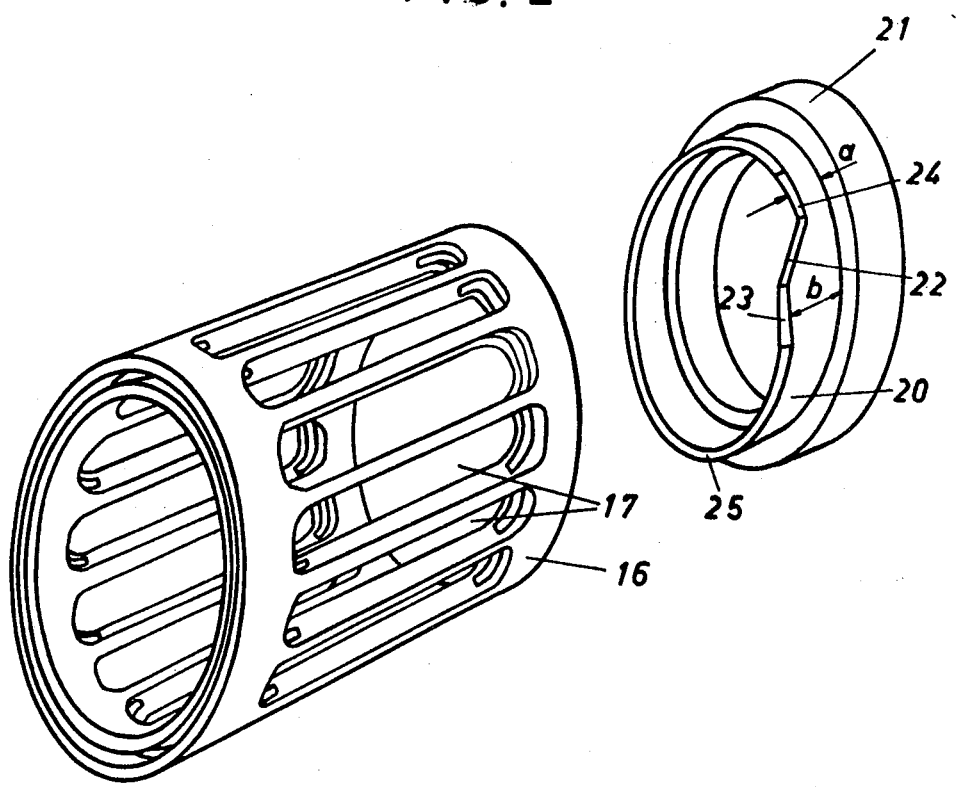
FIG. 2 is a perspective view of the cage and one cam element.

When the nut is turned in relation to the screw the rollers will be displaced along the screw and it is necessary for each revolution to bring the rollers back a distance corresponding to the pitch of the thread at the screw. A longitudinally extending groove 18 is formed in the internal face of the nut 12. On each occasion when a roller passes this groove it will be lifted out of engagement with the screw, and be pushed back by means of annular cam members 19 of the type best shown in FIG. 2. The cage 16 is provided with twin walls at its end portions, and one cam member is fitted at each end, between these walls. The cam path 20 proper is located between these twin walls and will in this manner obtain a protected position, and simultaneously be brought into contact with the rollers about at the longitudinal axes thereof.

The annular portion 21 of the cam member located outside the cage is more sturdy than the cam proper, and is provided with an externally threaded part by means of which the cam member is retained in the nut and thus also will maintain the rollers in their proper positions.

Figure 4:
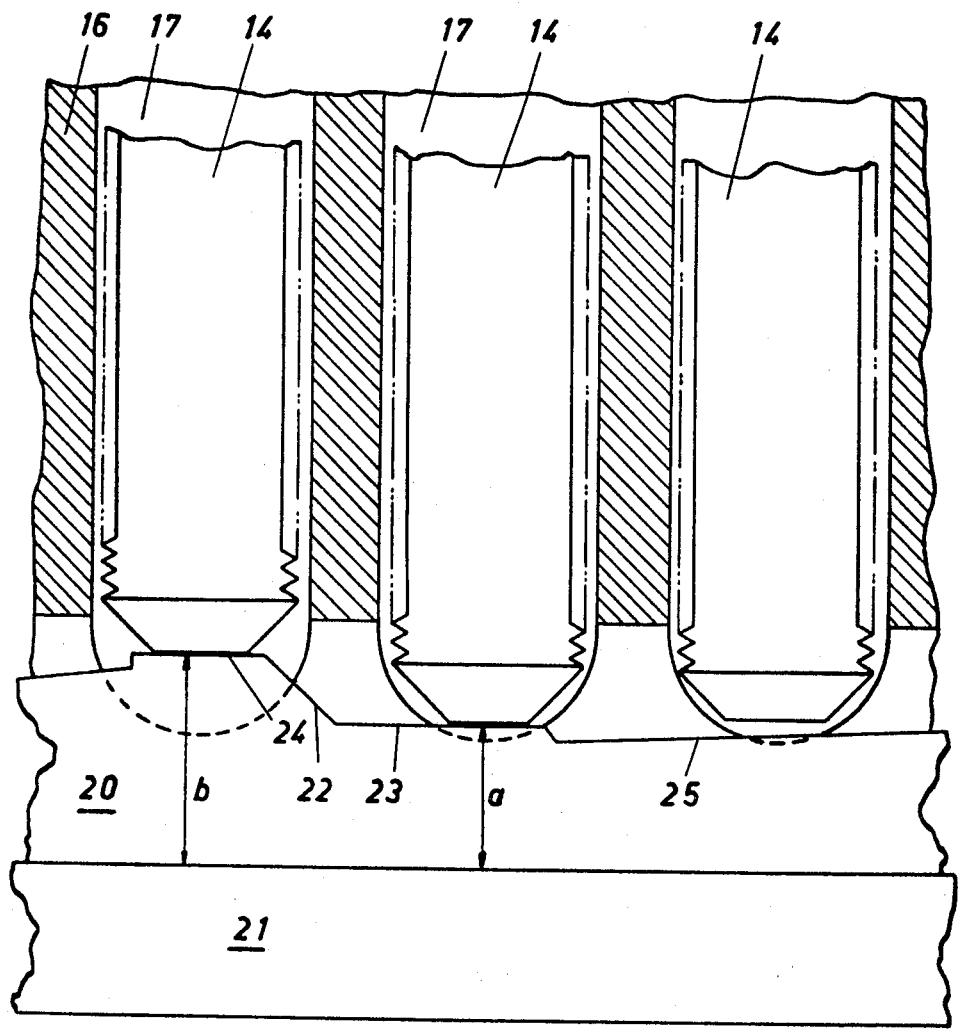
FIG. 4 shwos a development of a part of a cam member and the ends of the rollers cooperating therewith.

A developement of a part of the cam path is shown in FIG. 4. It is evident that the profiles of the two cams at opposite ends of the cage should be reversed in relation to each other, in such a manner that a raising curve at one member will correspond to a retracting curve at the other member.

During its movenent around the screw a roller is mainly guided by means of the threads in the screw and in the nut, respectively, and the action of the cam elements will appear on each occasion when the roller is brought to a position consiting with that of the groove 18 in the nut. It is evident from FIGS. 2 and 4 that each cam member comprises a steeply sloping portion 22, and to each side thereof a straight portion 23 and 24, respectively, upon which the rollers are prepared for the bringing out of, and into the thread 11 at the screw.

Between the straight portion 24 and the strait portion 23 the cam path runs around the member along a smoothly sinking curve 25, which does not have any contact with the rollers.

The distance between the straight portions 23 and 24 and the inwardly face of the annular portion 21 is denoted by $a$ and $b$, respectively, and the difference between these measures is equal to the pitch of the thread.

The cage may be manufacturded of an inner and an outer sleeve-shaped element, in which the portions defining the longitudinal sides of the slots 17 are folded into engagement with each other to lock the sleeve elements in the desired relative position. The cage will on this occasion be provided with twin walls all along its extension, which means a saving in weight compared to a solid cage, where the end portions only have been machined to provide the twin walls.

I claim:

1. In a screw and nut mechanism of the type where a cage supporting a plurality of rollers is fitted between an externally screw threaded shaft and an internally screw threaded nut enclosing the same, said rollers being provided with peripheral ribs meshing with the thread of said shaft and nut respectively, to form transmission elements therebetween, said rollers being operable during one revolution to be displaced in the axial direction of said shaft a distance corresponding to the pitch of its thread, and thereupon to be lifted free of its engagement with said shaft and be brought into a longitudinal groove in the nut, in which it is displaced backwards a distance corresponding to the pitch of the thread of said shaft, and then to engage the latter once more, the improvement comprising twin parallel walls at opposite axial ends of said cage, an annular cam member fitted at each end of said cage and having a sleeve portion at one portion shaped as a cam proper, extending inwardly between said twin walls to obtain contact with the juxtaposed ends of the rollers, and an external part for attachment to the nut in a position to being the cam proper into a position mating with that of the groove in the nut, said cams proper being reversely formed, one having a raising curve and the other a retracting curve.

* * * * *